(12) United States Patent
Greenthal

(10) Patent No.: US 8,831,415 B2
(45) Date of Patent: Sep. 9, 2014

(54) ROTATING CAMERA MOUNT WITH COUNTERWEIGHT

(71) Applicant: Nitroworks Corporation, Buena Park, CA (US)

(72) Inventor: Steven M. Greenthal, Buena Park, CA (US)

(73) Assignee: Nitroworks Corporation, Buena Park, CA (US)

( * ) Notice: Subject to any disclaimer, the term of this patent is extended or adjusted under 35 U.S.C. 154(b) by 0 days.

(21) Appl. No.: 13/798,506

(22) Filed: Mar. 13, 2013

(65) Prior Publication Data

US 2014/0016922 A1 Jan. 16, 2014

Related U.S. Application Data

(60) Provisional application No. 61/670,897, filed on Jul. 12, 2012.

(51) Int. Cl.
| | |
|---|---|
| *G03B 39/00* | (2006.01) |
| *G03B 17/00* | (2006.01) |
| *H04N 7/18* | (2006.01) |
| *F16M 11/10* | (2006.01) |
| *F16M 13/02* | (2006.01) |
| *F16M 11/20* | (2006.01) |
| *F16M 11/00* | (2006.01) |

(52) U.S. Cl.
CPC ............. *F16M 11/00* (2013.01); *F16M 11/10* (2013.01); *F16M 13/022* (2013.01); *F16M 11/2014* (2013.01); *F16M 2200/045* (2013.01); *F16M 2200/022* (2013.01); *G03M 17/56* (2013.01); *F16M 11/2078* (2013.01)
USPC .............................. 396/12; 396/419; 348/148

(58) Field of Classification Search
USPC .............. 396/12–13, 419–421, 428; 348/144, 348/148, 157; 248/187.1, 278.1
See application file for complete search history.

(56) References Cited

U.S. PATENT DOCUMENTS

| | | | |
|---|---|---|---|
| 2,506,095 A | 5/1950 | Mantz | |
| 3,467,350 A | 9/1969 | Tyler | |
| 3,891,301 A | 6/1975 | Heller | |
| 4,233,634 A | 11/1980 | Adams | |
| 4,645,320 A | 2/1987 | Muelling et al. | |
| 4,700,808 A * | 10/1987 | Haentjens .................... | 184/6.18 |
| 5,039,050 A | 8/1991 | Eidschun et al. | |
| 5,650,821 A | 7/1997 | Hewlett | |
| 5,778,259 A | 7/1998 | Rink | |
| 5,940,644 A | 8/1999 | Putora | |

(Continued)

*Primary Examiner* — WB Perkey
*Assistant Examiner* — Minh Phan
(74) *Attorney, Agent, or Firm* — Erickson Kernell Derusseau & Kleypas, LLC

(57) ABSTRACT

A rotatable camera mount for mounting on a vehicle is described. The mount includes a generally vertically aligned shaft that is coupled to a vehicle via a coupling assembly. A body is rotatably disposed on the shaft and provides a camera-mounting flange along one side and tail and swing-weight assemblies extending from an opposite side. The tail assembly provides a wing that extends into an airflow passing the mount to direct the camera with respect to the airflow. The swing-weight assembly counteracts forces on a camera coupled to the mounting flange when the vehicle encounters a turn to direct the camera into the turn. Rotation of the body about the shaft can be dampened by fluid dampening, brake assemblies, friction dampening, and hard stops. The shaft can be oriented at angle with respect to vertical to bias directing of the camera in a desired direction.

29 Claims, 15 Drawing Sheets

(56) References Cited

U.S. PATENT DOCUMENTS

| | | |
|---|---|---|
| 6,149,112 A | 11/2000 | Thieltges |
| 6,899,442 B2 | 5/2005 | Howell et al. |
| 7,090,416 B2 | 8/2006 | Mootz et al. |
| 7,241,060 B2 | 7/2007 | Mootz et al. |
| 8,077,212 B2 | 12/2011 | Chapman |
| 2005/0265711 A1* | 12/2005 | Heibel .......................... 396/419 |

* cited by examiner

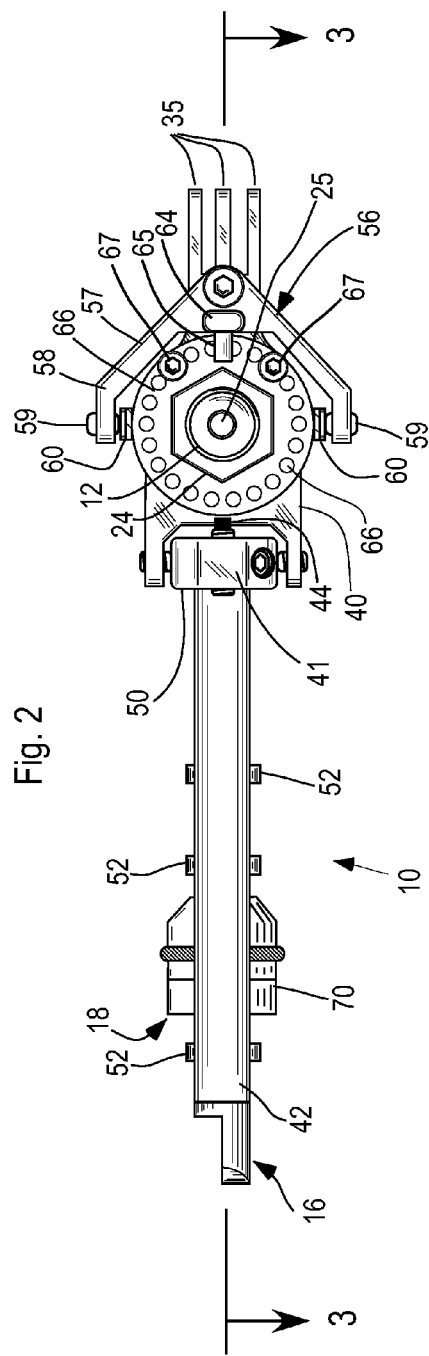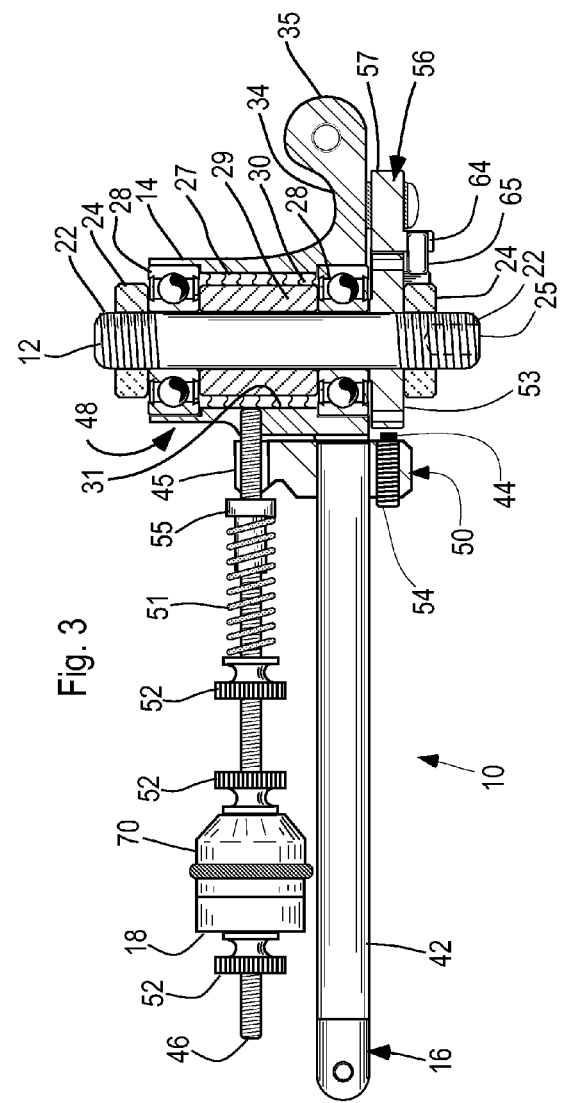

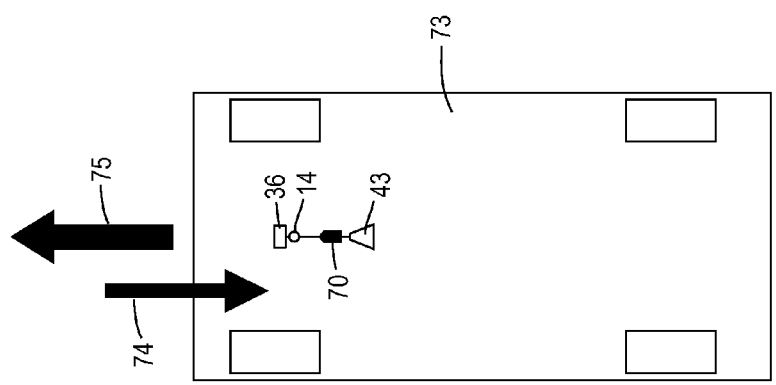

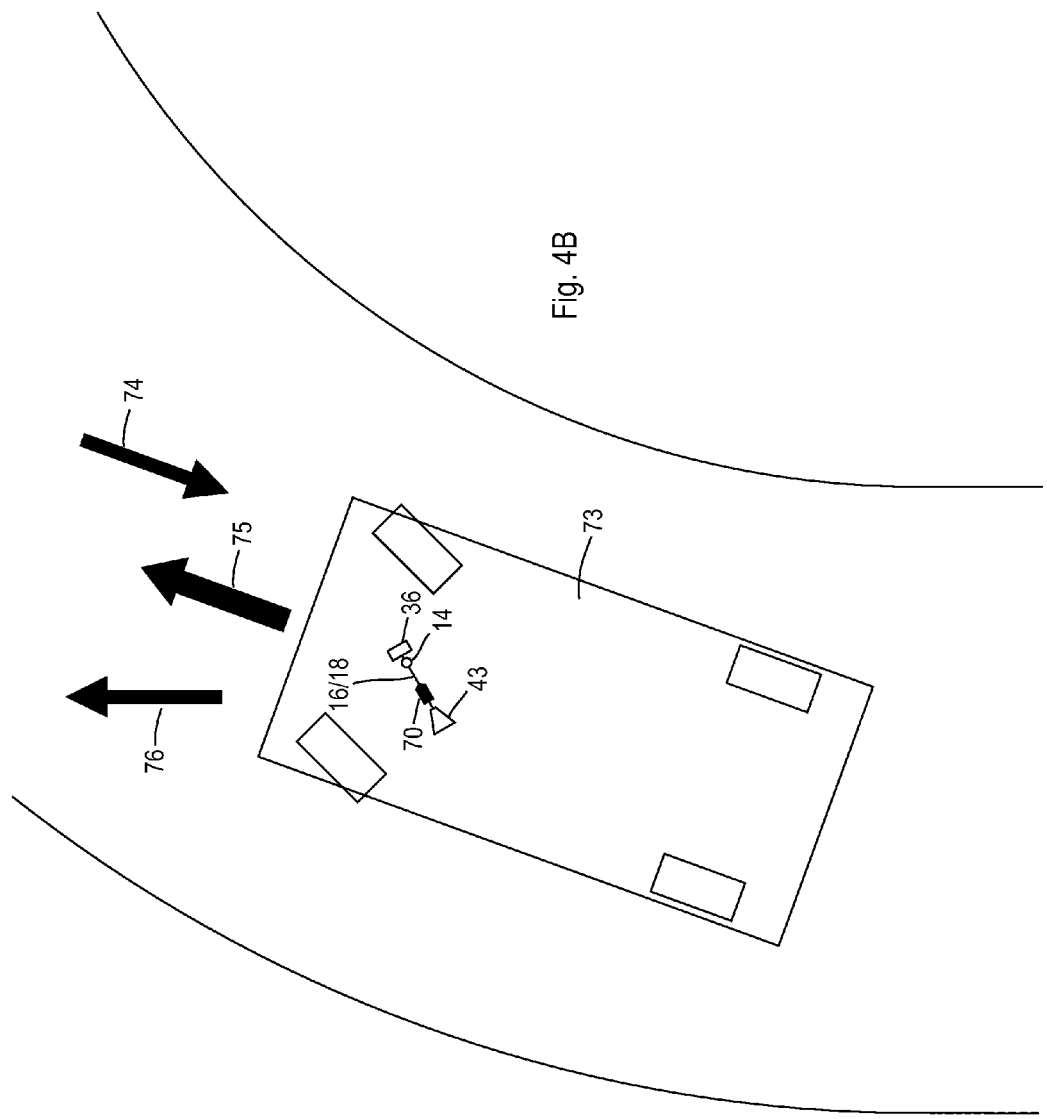

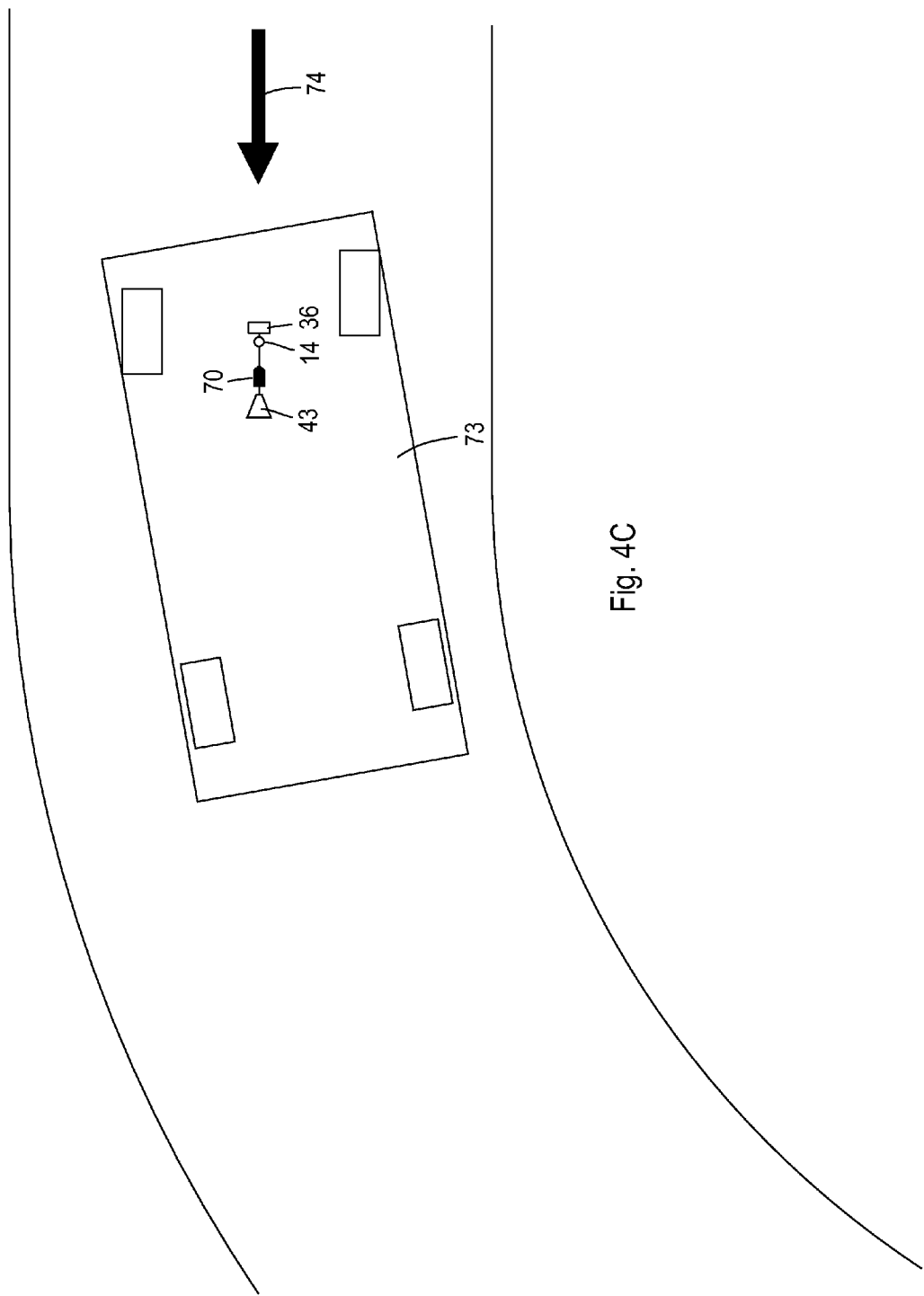

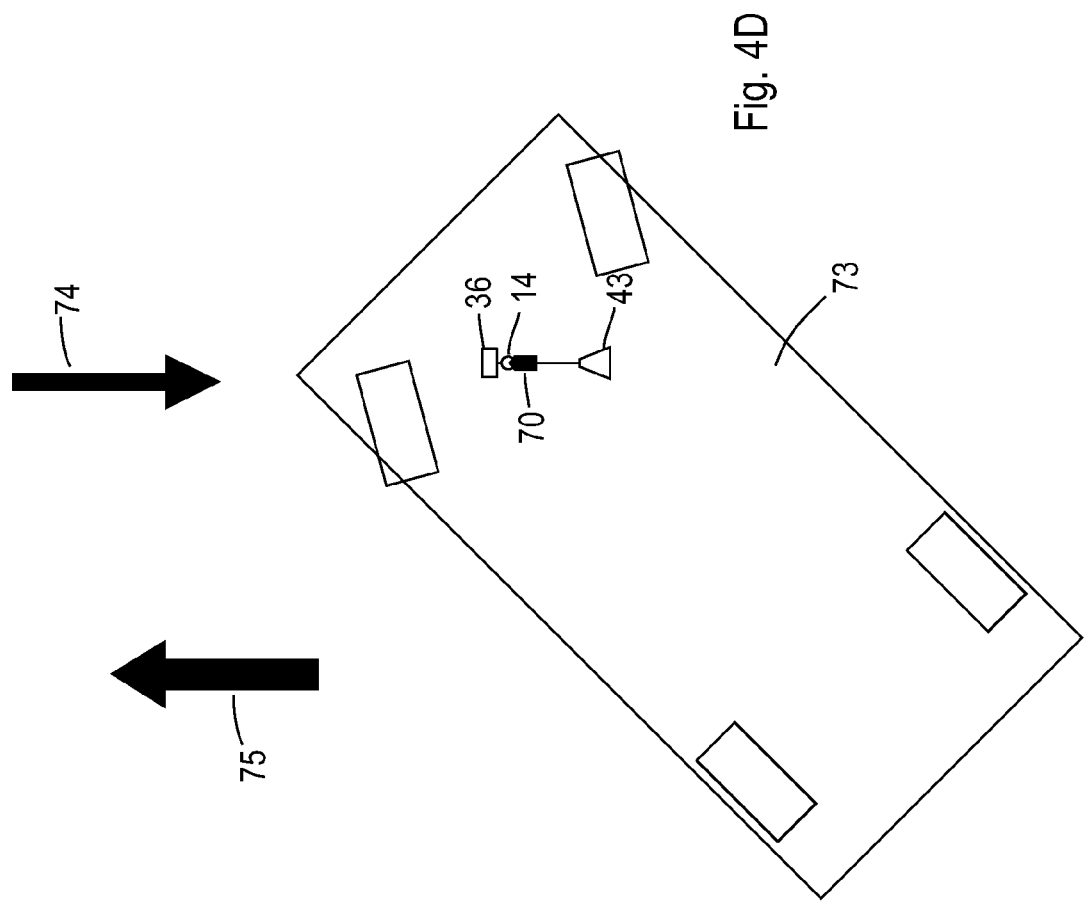

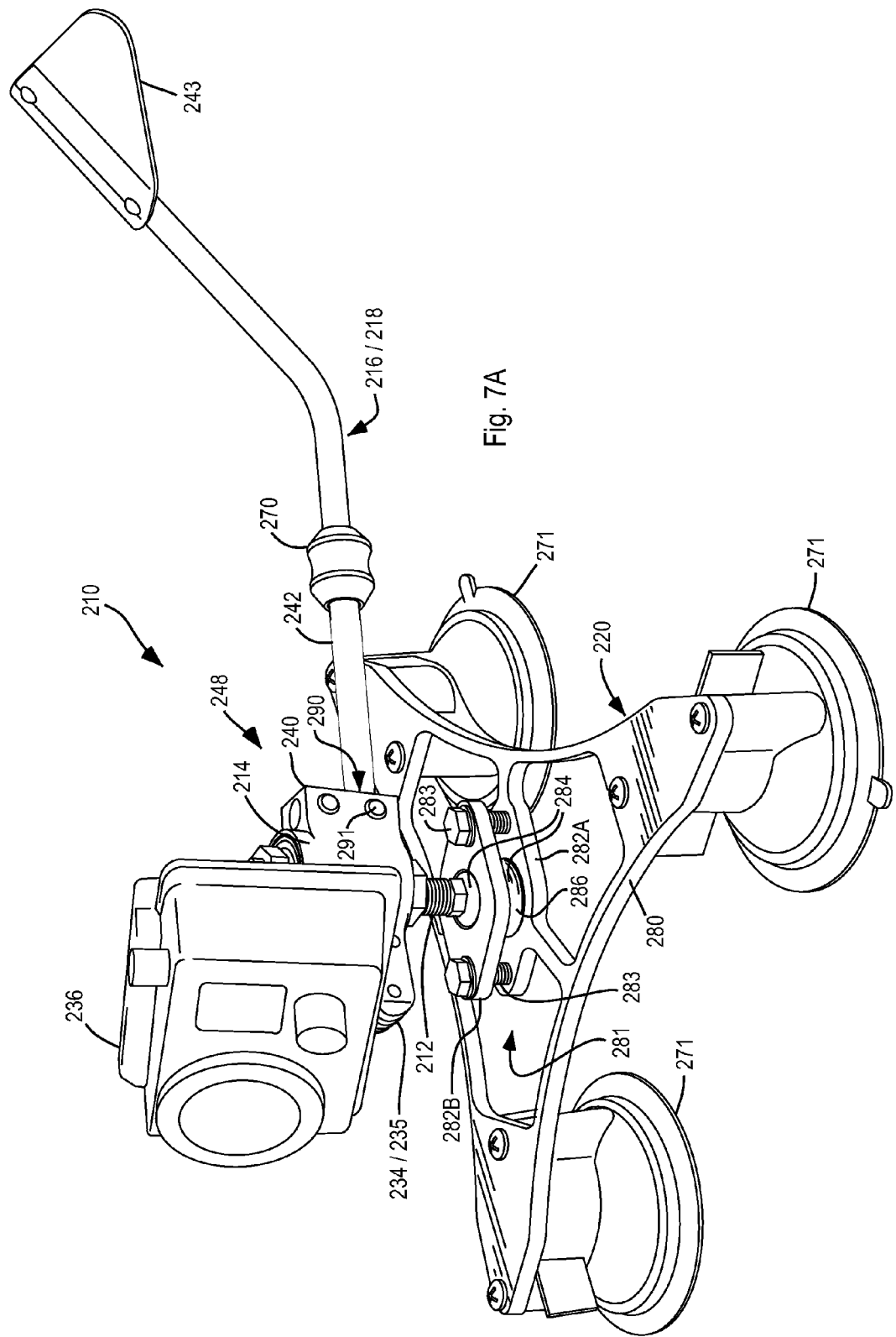

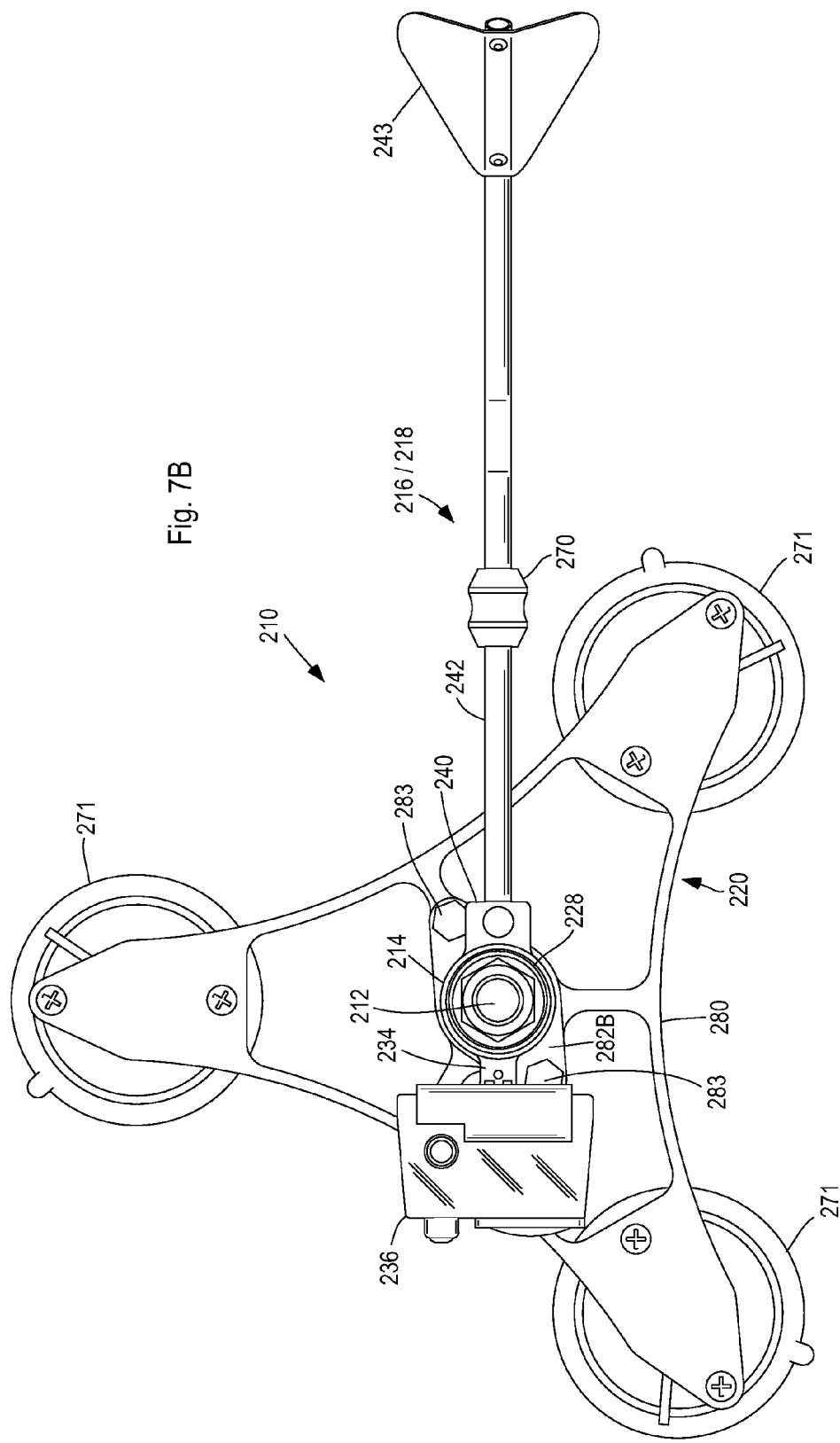

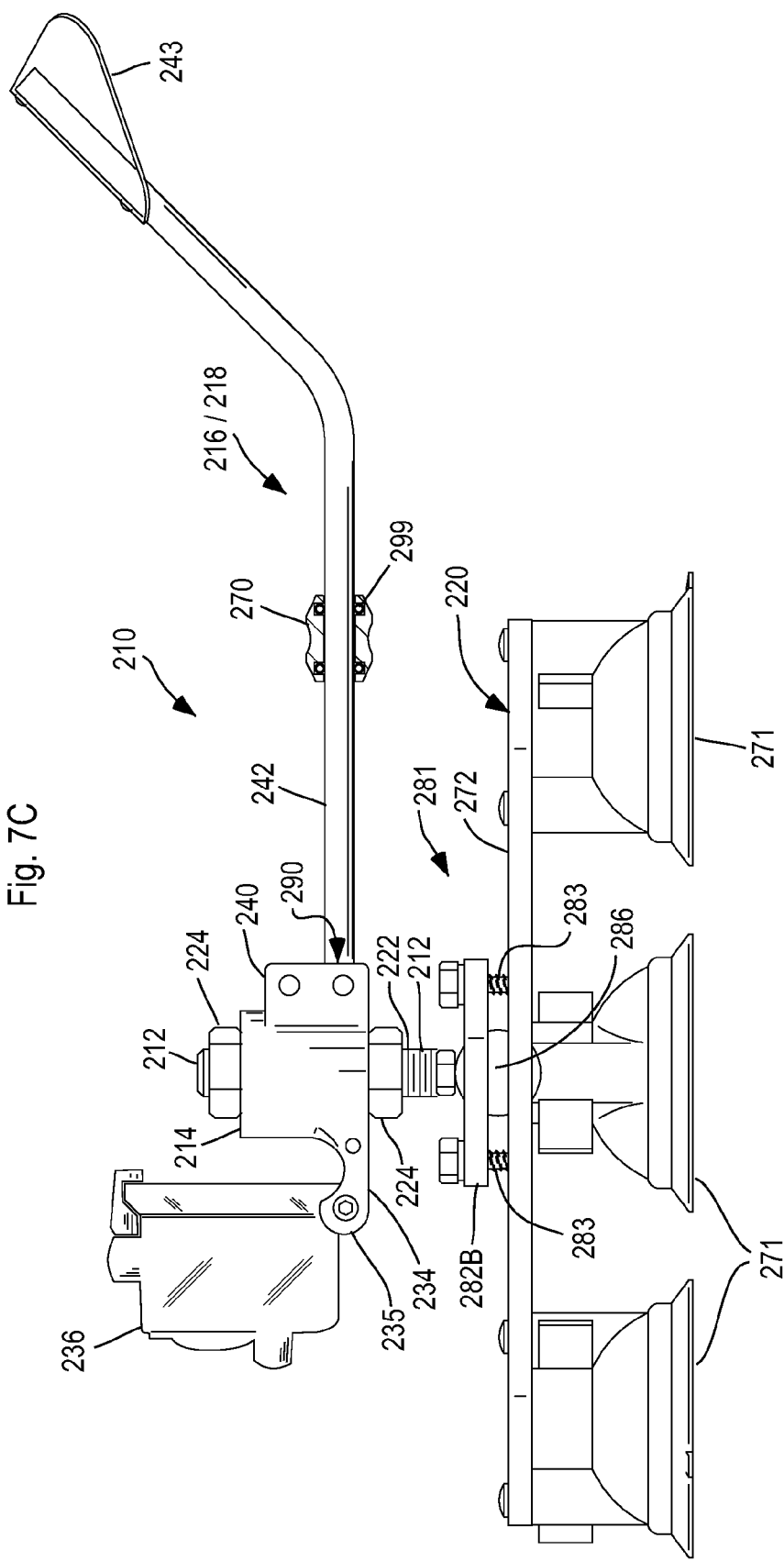

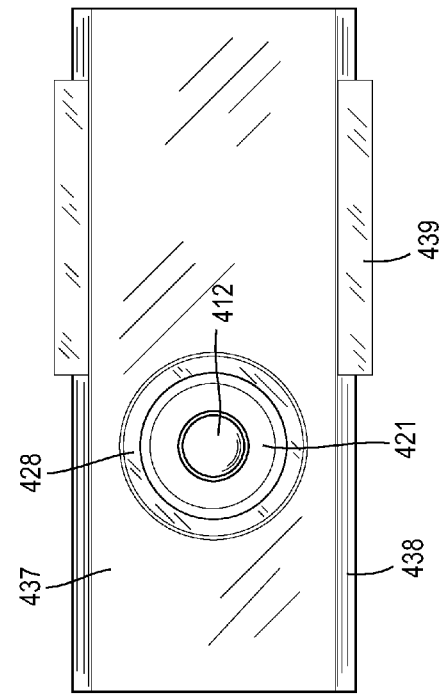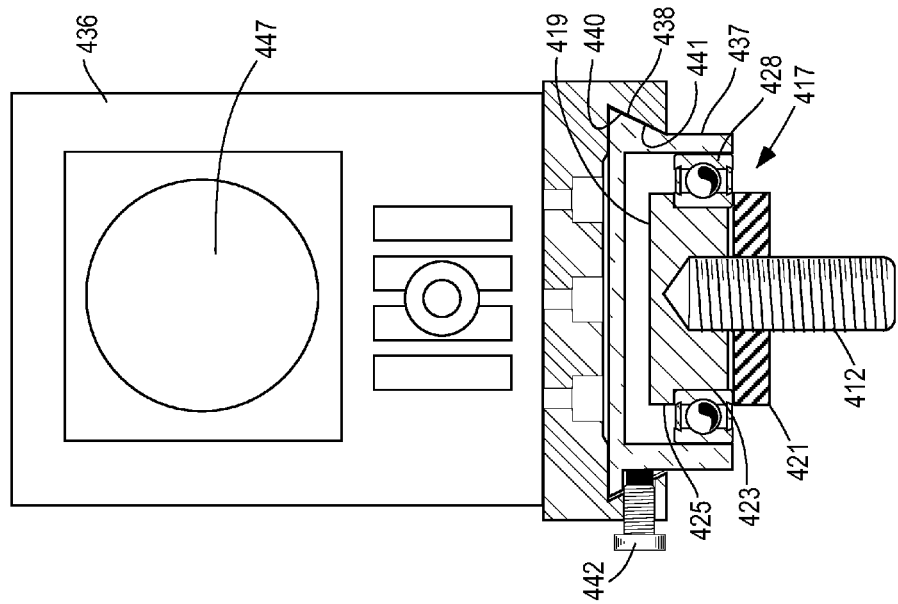

ROTATING CAMERA MOUNT WITH COUNTERWEIGHT

CROSS-REFERENCE TO RELATED APPLICATIONS

This application claims priority to U.S. Provisional Patent Application No. 61/670,897, filed Jul. 12, 2012, the disclosure of which is hereby incorporated herein in its entirety by reference.

BACKGROUND

Traditional sports camera mounts that are mounted on a vehicle are typically rigidly mounted to prevent camera movement while the vehicle is in motion. This limits camera view to the direction the installer points the camera upon installation, and the resulting video will not deviate to include anything outside the stationary camera's field of view.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter. In brief, this disclosure describes, among other things, a camera mounting device designed to hold a camera for recording from moving vehicles that enables the camera to track various views, including in the direction of travel, based on a swing-weight mechanism affected by centrifugal force, airflow, and user-defined mechanical adjustments.

The camera mount includes a base that is attachable to a vehicle exterior and a body that is rotatably coupled to the base. A camera and a tail assembly are coupled to opposite sides of the body. The tail assembly includes a wing that interacts with an airflow created by movement of the vehicle to direct the camera with respect to the direction of the airflow. The tail assembly also includes a swing-weight that is useable to direct the camera based on centrifugal forces applied to the camera mount and/or gravity.

In a standard configuration of the camera mount in which the rotational axis of the body is aligned substantially vertically, as a vehicle moves forward in a straight line the camera mount points the camera view forward. As the vehicle turns, the swing-weight is affected by centrifugal force and causes the camera mount to rotate or swing, pointing the camera view into the direction of the turn similarly to the way a driver would look into a turn. This swing action is adjustable or tunable by a user to remove unwanted instability or to allow more or less movement of the camera. The mount contains adjustment mechanisms allowing the user to tune the camera mount to achieve optimum shooting accuracy in a desired situation. In a non-standard use of the camera mount, the mount may not necessarily be pointed forward or into the direction of travel of the vehicle based on the configuration of the camera mount established by the user.

DESCRIPTION OF THE DRAWINGS

Illustrative embodiments of the invention are described in detail below with reference to the attached drawing figures, and wherein:

FIG. 2 is a partial, bottom plan view of the camera mount of FIG. 1;

FIG. 3 is a cross-sectional view taken generally along line 3-3 of FIG. 2;

FIGS. 4A-C are diagrammatic views of a camera mount mounted on a vehicle traveling along a path that goes from linear to curved and back to linear;

FIG. 4D is a diagrammatic view of a camera mount mounted on a vehicle sliding in a direction other than the direction the vehicle is oriented;

FIG. 7A is perspective view of a camera mount depicted in accordance with another embodiment of the invention;

FIG. 7B is top plan view of the camera mount of FIG. 7A;

FIG. 7C is side elevational view of the camera mount of FIG. 7A with a weight mounted thereon shown in cross-section;

FIG. 12 is a cross-sectional view taken along the line 12-12 of FIG. 11; and

FIG. 13 is a bottom plan view of the alternative camera mount of FIG. 11.

DETAILED DESCRIPTION

Figure 1:
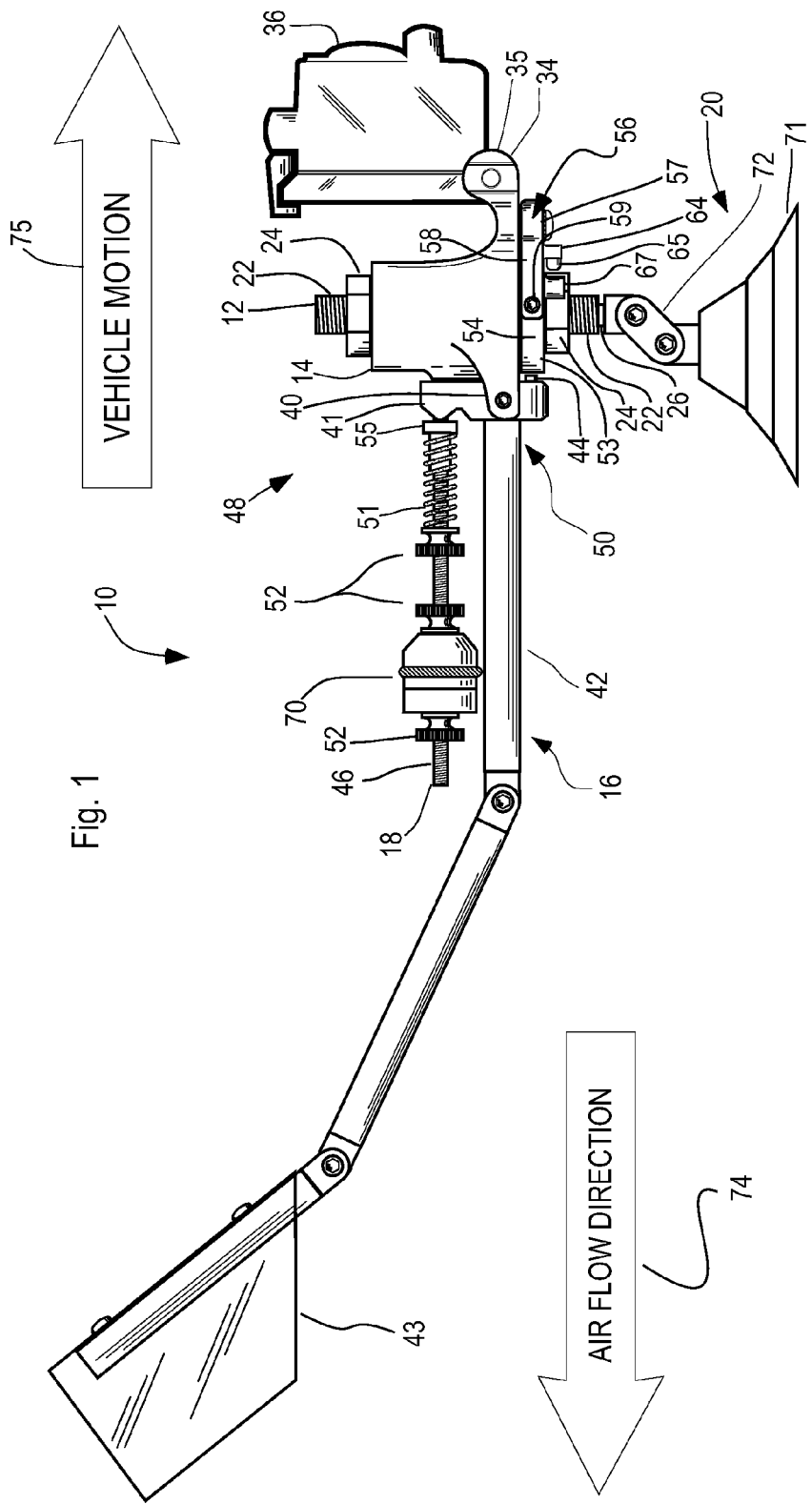
FIG. 1 is a side elevational view of a camera mount depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention are described herein with respect to the drawings in which reference numerals are employed to identify particular components or features. Similar elements in the various embodiments depicted may be provided with reference numerals having matching second and third digits but with differing first digits, e.g. element 12 is similar to elements 112, 212, etc. Such is provided to avoid redundant description of similar features of the elements but is not intended to indicate the features or elements are necessarily the same.

With reference to FIGS. 1-3, a camera mount 10 is described in accordance with an embodiment of the invention. The mount 10 includes a shaft 12, a body 14, a tail assembly 16, and a swing-weight assembly 18 that are useable to mount a camera 36 on a vehicle 73 (as shown diagrammatically in FIGS. 4A-D) and to employ airflow past the camera mount 10 and centrifugal forces on the mount 10 to control the directional orientation of the camera 36. As such, the camera mount 10 can be configured to use centrifugal forces to swing a camera 36 mounted thereon into a vehicle's turning path in much the same way a driver of the vehicle would look into the turn and to use the airflow over the tail assembly 16 to urge the camera mount 10 to rotate the camera 36 to point it back into the direction of travel of the vehicle. The mount 10 can also be configured to minimize the effect of centrifugal forces on the camera mount 10 and use the airflow over the tail assembly 16 to orient the camera 36 to point into the direction of travel of the vehicle which may be more desirable in activities such as competitive drifting where the driver engages in controlled slides and the vehicle's heading often does not correspond with the vehicle's direction of movement.

The shaft 12 comprises an elongate rod or shaft that is coupled to a coupling assembly or base 20. As used herein, shaft is not intended to be limited to a rod or the like. As used herein, shaft is intended to encompass any structure about which the body 14 or other structure for supporting the camera rotates or pivots. A shaft axis extends longitudinally through the center of the shaft 12 along its length. The shaft 12 can include one or more threaded portions 22 or other means for coupling to the base 20 and for receiving nuts 24 or other fasteners for retaining a rotatable coupling with the body 14, as described below. One of the threaded portions 22 may include a threaded bore 25 in an end of the shaft 12 that is configured for receiving a threaded stud or base connector 26 associated with the base 20.

The body 14 has a cylindrical bore 27 extending through its height and configured to receive the shaft 12 coaxially therein. A bearing assembly 28 is disposed at each end of the bore 27. The bearing assemblies 28 include a plurality of ball bearings disposed between a pair of concentric rings or races that are rotatable with respect to one another as known in the art. The bearing assemblies 28 can alternatively comprise another bearing means configured to enable the shaft 12 to rotate coaxially within the bore 27, such as, for example and not limitation, a washer or O-ring comprised of a low friction material like silicon, TEFLON, or the like. The bearing assemblies 28 have an outer diameter that is substantially equal to an inner diameter of the bore 27 so as to enable the bearing assemblies 28 to be press-fit into each end of the bore 27 and thus frictionally retained therein. The bearing assemblies 28 might alternatively be mechanically retained in the bore 27 via one or more fasteners, tabs, lips, grooves, or the like. The bearing assemblies 28 include an aperture extending centrally therethrough and having a diameter that is just larger than the diameter of the shaft 12. The shaft 12 is thus slidably insertable in the aperture but may, at least partially, frictionally engage a wall of the aperture.

A sleeve 29 is disposed within the bore 27 to extend between the bearing assemblies 28 and coaxially therewith. The sleeve 29 has an inner diameter that is substantially equal to that of the bearing assemblies 28 and thus just larger than the diameter of the shaft 12 to at least partially frictionally engage the shaft 12. An outer diameter of the sleeve 29 is less than the interior diameter of the bore 27 so as to form a void 30 between the sleeve 29 and an interior wall 31 of the bore 27.

A fluid or gel of selectable viscosity is disposed in the void 34. The fluid may comprise, for example, a silicon gel, an oil, a grease, or the like. Interaction between the interior wall 31 of the bore 27, the fluid, and the sleeve 29 provide fluid dampening of rotational movements of the sleeve 29 and thus the shaft 12 inserted therein. The viscosity of the fluid and the dimensions and/or surface features of the sleeve 29 are selectable to tailor the fluid dampening to a desired application. One or more apertures may be provided in the body 12 to provide access to the void 30 for filling with the fluid.

The shaft 12 is disposed in the body 14 coaxially with the bore 27. The shaft 12 extends through and at least partially frictionally engages each of the bearing assemblies 28 and the sleeve 29. A nut 24 is disposed on each end of the shaft 12 on opposite ends of the bore 27 to retain the shaft 12 within the bore 27 and prevent axial movements of the shaft 12 therein. The nuts 24 may abut surfaces of the bearing assemblies 28. As such, the body 14 is rotatable about the shaft 12 via the bearing assemblies 28 and rotational movement of the body 14 can be dampened by fluid dampening via engagement between the sleeve 29 and the shaft 12.

A camera-mounting member 34 extends radially outward from a first side of the body 14. The camera-mounting member 34 shown is formed integral with the body 14, but it is foreseen that it could be formed separate from and attached to the body by mechanical fasteners or other suitable fastening means. The camera-mounting member 34 includes one or more flanges, flattened prongs or tangs 35 disposed at a distal end that are configured to couple to a camera 36.

The camera 36 can comprise a still and/or video camera that employs film or digital image capture means as known in the art and can be disposed within a protective housing, as depicted in the drawings, or directly or indirectly coupled to the mount 10. For example, and not limitation, the camera 36 can be a camera from the GOPRO HERO series of cameras from Woodman Labs, Inc. of San Mateo, Calif., such as the HD HERO3. The mounting flanges 35 allow the camera 36 to be pivotably adjusted about a generally horizontal axis, e.g. an axis that is perpendicular to the shaft 12, or about another axis. As depicted in the figures, the camera mounting member 34 includes three parallel vertical flanges 35 between which a pair of flanges associated with the housing for camera 36 can be received and coupled thereto via a fastener 37 inserted perpendicularly through aligned apertures extending through the flanges 35 and in the flanges associated with the housing for the camera 36. The fastener 37 may be threaded at one end and have a knob secured at an opposite end with the threaded end received within a nut to allow the fastener to be tightened to compress the two flanges on the camera housing between the three flanges 35 of the camera-mounting member 34 to fix the pivotal orientation of the camera housing and camera 36 relative to the camera-mounting member 34.

Figure 5:
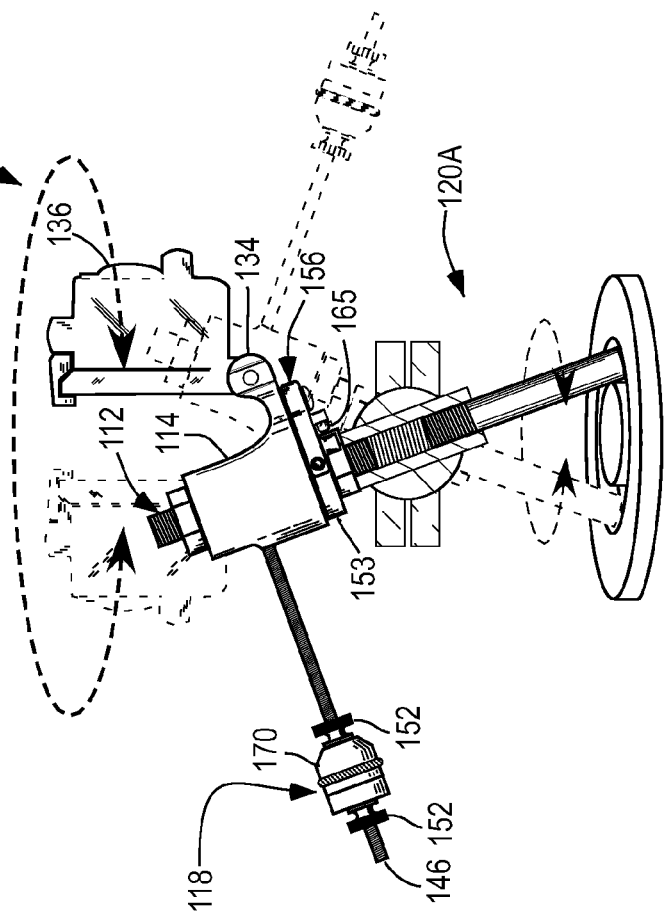
FIG. 5 is a side elevational view of an inclined camera mount depicted in accordance with an embodiment of the invention.
Figure 6:
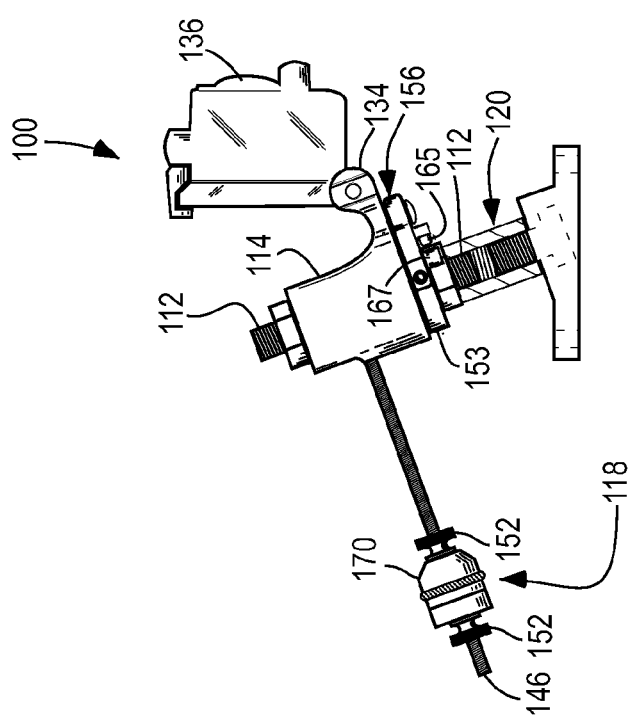
FIG. 6 is a side elevational view of a camera mount with gimbal steering depicted in accordance with an embodiment of the invention.

A tail-mount 40 is formed on and extends from a second side of the body 14 opposite the camera-mounting member 34. The tail-mount 40 provides mounting locations for the tail assembly 16. As depicted in FIGS. 1-3, the tail-mount 40 generally comprises a clevis having a pair of arms between which the tail assembly 16 is pivotally coupled. In some embodiments, such as depicted in FIGS. 5 and 6, the tail-mount 40 is omitted. And in other embodiments, the tail-mount 40 is configured to fixedly couple the tail assembly 16 to the body 14, as depicted in FIGS. 7-10 and described more fully below.

The tail assembly 16 includes a pivot member 41, an arm or elongate member 42, and a stabilizing wing 43. The stabilizing wing 43 generally comprises a pair of fins or vanes extending from opposite sides of the arm 42. The pivot member 41 is pivotally coupled to the tail-mount 40 and extends generally parallel to the shaft axis of shaft 12. A braking pin 44 extends from a bottom end of the pivot member 41 in a direction toward the shaft 12. An upper end of the pivot member 41 includes a fork 45 configured to receive or extend around a swing weight support rod or member 46 of the swing-weight assembly 18 which is described in more detail below. The swing weight support rod 46 in the embodiment shown is threaded and threadingly secured to or coupled to the body 14 and projects radially outward therefrom on a side opposite the camera-mounting member 34 and in generally planar spaced alignment with the arm 42 of the tail assembly 16.

The arm 42 of tail assembly 16 is fixedly coupled to the pivot member 41 and may be aligned with the coupling between the pivot member 41 and the tail-mount 40. The arm 42 extends from the pivot member 41 and radially outwardly relative to the body 14. The arm 42 may comprise a single, unitary member or a plurality of members or segments pivotally and/or rotational coupled together. The members of the arm can be hollow tubing or solid rod made from metals like aluminum or titanium alloys, plastics, composites, or the like. As depicted in FIG. 1, the arm 42 extends substantially horizontally a distance and then slopes upward a distance at one or more angles. The arm 42 shown in FIG. 1 is formed from three segments with adjacent segments secured together with a set screw at overlapping ends or joints. The set screw is loosened to allow adjustment of the angular orientation of adjacent segments and tightened to fix the angular orientation. The wing 43 is shown disposed at or near a distal end of the arm 42, however, it is to be understood that the wing 43 could be located inward from the distal end of the arm 42 and in closely spaced relation to the body 14. The wing 43 is of a shape and form suitable to align the rotatable components of the mount 10 with a flow of air past the mount 10 when the mount 10 is mounted on a moving vehicle. The rotatable components may be referred to as the rotating mount assembly 48 and include the body 14, the camera mounting member 34, the tail assembly 16 and the swing-weight assembly 18 all of which rotate about or relative to the shaft 12 through the body 14. The rotating mount assembly 48 generally comprises the body 14 and the other structure mounted thereon that rotates about shaft 12.

One or more mechanisms can be employed to dampen and/or restrict rotational movement of the body 14 about the shaft 12. A tail-brake mechanism 50 employs a coil spring 51 disposed on the threaded rod 46 of the swing-weight assembly 18 and compressed between a thumbnut 52 or other fastener and a flanged sleeve 55 slidably mounted on the threaded rod 46. The flanged sleeve 55 abuts against the fork 45 at the upper end of the pivot member 41. The coil spring 51 presses the flanged sleeve 55 against the upper end of the pivot member 41 to rotate the pivot member 41 in a first direction about the coupling with the tail-mount portion 40 and in particular rotates the upper end of the pivot member 41 towards the body 14. Rotation of the pivot member 41 in the first direction also draws the braking pin 44 away from a friction disc 53.

The friction disc 53 is fixedly coupled to the shaft 12 and includes an exterior face 54 that is engageable by the braking pin 44 when the pivot member 41 is rotated in an opposite, second direction. The exterior face 54 includes a material, such as a rubber or plastic, configured to frictionally engage the brake pin 44 to resist sliding of the brake pin 44 across face 54. The exterior face 54 might also include surface features like vertically disposed ridges or gear teeth that are mechanically engaged by the brake pin 44 to resist sliding of the brake pin 44 along the exterior face 54.

The tail-brake mechanism 50 is actuated by an airflow producing a downward force on the tail assembly 18 that is sufficient to rotate the pivot member 41 in the second direction and to overcome the opposite force applied by the coil spring 51. Rotation of the pivot member 41 in the second direction causes the braking pin 44 to contact and press against the exterior face 54 of the friction disc 53 and to, at least partially resist rotation of the body 14 about the shaft 12. The greater the force applied by the airflow the greater the braking force applied between the braking pin 44 and the friction disc 53. Therefore, the faster the vehicle travels, the greater the braking force applied.

The amount of force required to activate the tail-brake mechanism 50 is adjustable by adjusting the thumbnut 52 to increase or decrease compression of the coil spring 51 against the upper end of the pivot member 41. The wing 43 might also be configured to adjust an amount of wind resistance produced by the wing 43 in the airflow and thus the amount of force applied by the airflow.

A second braking mechanism comprises an adjustable drag mechanism 56 which is best seen in FIG. 2. The drag mechanism 56 includes a forked bracket or yolk 57 that is rigidly coupled to the body 14 and includes one or more fingers or arms 58 with a brake-adjustment screw 59 disposed at a distal end of each finger 58. The brake-adjustment screws 59 are adjustable to extend a desired distance from the finger 58 and into contact with the friction disc 53. A friction pad 60 may be disposed on a distal end of the brake-adjustment screws 59 to increase friction and/or surface area in contact with the friction disc 53. As such, the brake-adjustment screws 59 are adjustable into contact with the friction disc 53 to provide a desired level of friction or drag between the screws 59 and the disc 53 and thus a desired amount of resistance to rotation of the body 14 with respect to the shaft 12.

One or more hard stops can also be provided to restrict rotation of the body 14 to a desired range of motion or to restrict all rotation of the body 14 with respect to the shaft 12. As depicted in FIGS. 2 and 3, flange 64 depends downwardly from the bracket 57 or from the body 14 and includes a pin 65 extending from a distal end thereof and toward the shaft 12 to at least partially overlap an underside of the friction disc 53. The underside of the friction disc 53 includes a plurality of threaded bores 66 formed therein and aligned parallel to the shaft 12. The bores 66 are arranged along a circular path in the underside of the friction disc 53; the path being overlapped by the stop pin 65. One or more obstructing members 67 can be threadably inserted in selected respective ones of the bores 66 to abut or engage the stop pin 65 as the friction disc 53 and body 14 rotate. Thereby, the range of rotational movement of the body 14 is restricted to the spacing between the obstructing members 67.

The swing-weight assembly 18 further comprises one or more weights 70 disposed on the rod 46. The rod 46 extends radially outward from the body 14, parallel to the tail assembly 16, and generally perpendicularly to the shaft 12. The weights 70 include a central aperture that is configured to receive the rod 46. The rod 46 shown is threaded to threadably receive one or more thumb nuts 52 thereon. The weights 70 are disposed on the rod 46 between a pair of thumbnuts 52 which can be tightened against opposite sides of the weights 70 to maintain the position thereof along the length of the rod 46. The thumbnuts 52 can be threadably moved along the length of the rod 46 to adjust the position of the weights 70 closer or further from the body 14. Alternatively, only a single thumbnut 52 can be used and disposed between the distal end of the rod 46 and the weights 70. The thumbnuts 52 might also be omitted by employing weights 70 that engage the rod 46 to maintain their position, e.g. threadably or frictionally engage the rod 46. By adjusting the position of the weights 70 along the rod 46, the center of mass of the rotating mount assembly 48 with a camera 36 mounted thereon can be adjusted relative to the shaft 14.

Referring to FIG. 1, the coupling assembly or base 20 comprises any means useable to couple the camera mount 10 to a vehicle. For example, coupling assembly 20 may include one or more coupling elements, such as suction cups 71, magnets, or the like, and an adjustable frame or linkage 72 that couples to the shaft 12 of the camera mount 10. The suction cups 71 can be configured to removeably attach to an exterior surface of a vehicle. The frame or linkage 72 can support the camera mount 10 on the suction cups 71 or can directly attach to the vehicle exterior or interior. The frame 72 can also enable adjustment of the orientation of the camera mount 10 to place the shaft 12 in a vertical orientation or tilted out of vertical alignment as desired. The frame 72 may also incorporate or include the threaded stud 26 for receipt in the bore 25 of the shaft 12 for coupling thereto.

With continued reference to FIGS. 1-3 and 4A-4D operation of the camera mount 10 is described in accordance with an embodiment of the invention. The camera mount 10 is mounted on an exterior surface of a vehicle 73, such as on a hood or roof thereof, using the coupling assembly 20. As described previously, the coupling assembly 20 might employ suction cups 71 or magnets to removeably couple to the vehicle 73 or can employ one or more fasteners. The coupling assembly 20 is adjusted to position the shaft 12 in a vertical orientation when the vehicle 73 is resting on a level surface. The camera 36 (which may include a housing) is coupled to the body 14 via the mounting flanges 35 and the tail assembly 16 is adjusted, if applicable, to place the wing 43 in a position to receive an airflow (indicated by arrows 74 in FIGS. 4A-D) flowing across the camera mount 10.

Figure 11:
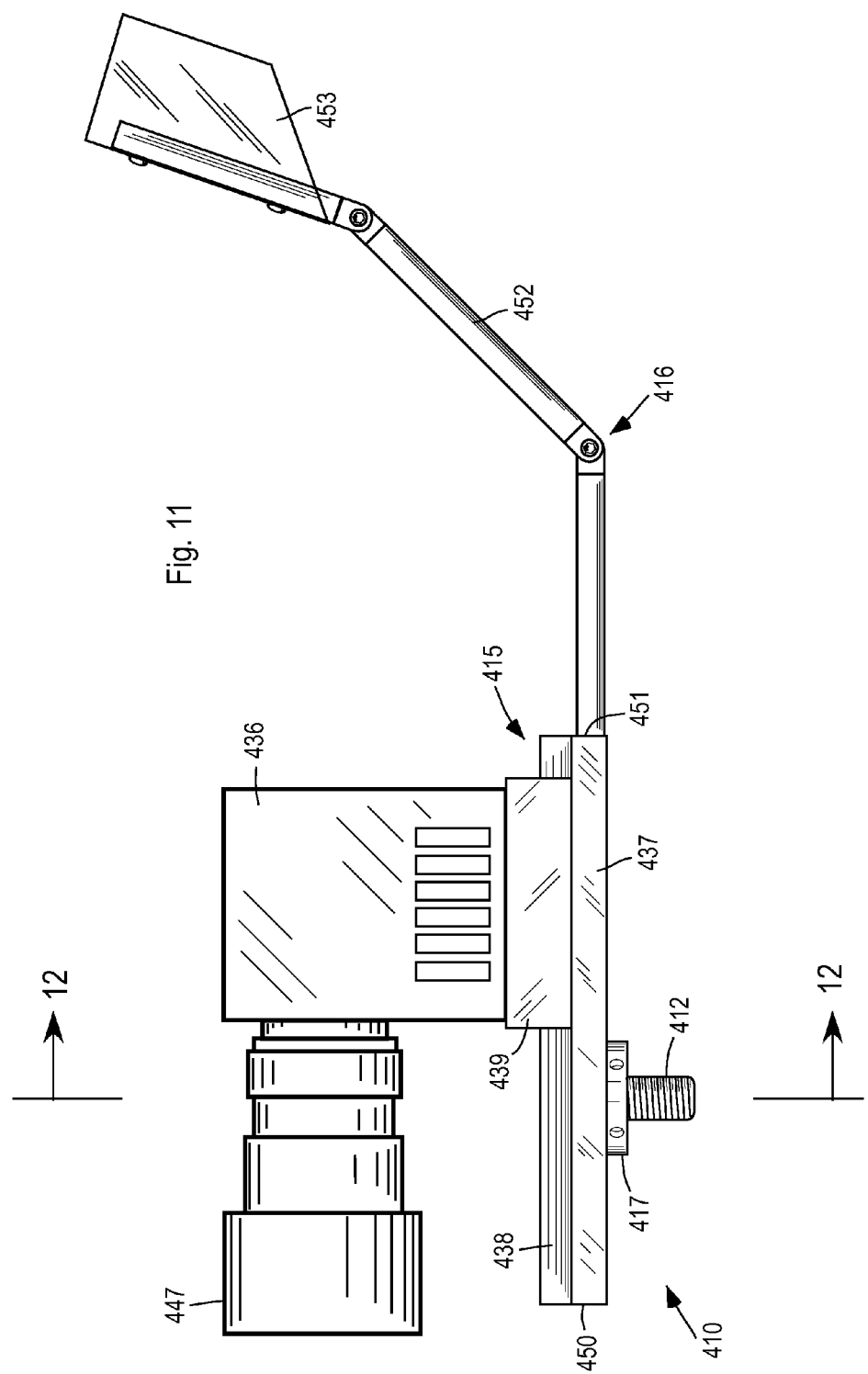
FIG. 11 is a side elevational view of an alternative camera mount with an adjustable camera position depicted in accordance with an embodiment of the invention.

The swing-weight assembly 18 is adjusted to provide a desired amount or number of weights 70 at a desired distance from the body 14. In a typical application, the weights 70 are adjusted to position the center of mass of the rotating mount assembly 48 with the camera 36 mounted thereon in spaced relation from the shaft 12 on the second side of the body, corresponding to the side from which the tail assembly 16 and swing weight assembly 18 extend. Because the mass is unbalanced relative to the axis of rotation through shaft, centrifugal forces acting on the rotating mount assembly 48 as the vehicle turns will cause the rotating mount assembly 48 with the camera 36 mounted thereon to swing or rotate about the shaft 12 to a greater degree than it would if the center of mass was located over the shaft 12. The further the center of mass is spaced from the shaft 12, the greater the centrifugal forces acting on the rotating mount assembly 48 and the greater the degree of swinging or rotation of the rotating mount assembly 48 as the vehicle 73 turns. The applied centrifugal force can be adjusted by adjusting the distance between the weights 70 and the shaft 12 and/or by adjusting the amount of weight or mass of the weights 70. The position of the camera 36 might also be adjusted to adjust or vary the centrifugal forces and/or torque forces applied, as depicted in FIGS. 11-13 and described more fully below.

The tail-brake mechanism 50, drag mechanism 56, and/or any hard stops can also be adjusted. An amount of compression on the coil spring 51 or the shape/form of the wing 43 if the tail-brake mechanism 50 can be configured to adjust the amount of force or the velocity of airflow required to activate the tail-brake mechanism 50. The brake-adjustment screws 59 can also be adjusted to apply a greater or lesser amount of drag or resistance to rotation of the body 14. And obstructing members 67 can be inserted into selected bores 66 in the friction disc 53 to restrict rotational movements of the mount 10 as desired.

As the vehicle 73 is driven along a generally linear path, as depicted by arrow 75 in FIG. 4A, the airflow 74 passing the mount 10 resulting from the vehicular motion causes the tail assembly 16 to function similarly to a wind vane to align tail assembly 16 with the airflow direction and to thus point the camera 36 into the airflow which corresponds to the direction of travel 75. The airflow 74 against the wing 43 applies a force thereon and, if sufficient, activates the tail-brake mechanism 50. The tail assembly 16 thus pivots about its connection with the arm 40 to compress the coil spring 51 and press the braking pin 44 against the friction disc 53. As such, the tail-brake mechanism 50 aids to maintain the tail assembly 16 and the camera 36 in alignment with the airflow 74 and to resist wagging or back-and-forth movements the mount 10 caused by the airflow 74 contacting the surfaces of the mount 10, e.g. uneven surfaces of the camera 36, at elevated vehicular and/or airflow velocities.

As depicted in FIG. 4B, when the vehicle 73 enters a turn, the centrifugal forces acting on the unbalanced mass produced by the swing-weight assembly 18 operates to rotate the body 14 to a greater degree than the vehicle turns thereby directing the camera 36 into the direction of the turn. In a turn, the centrifugal forces acting on the weights 70 and/or the torque applied by the swing-weight assembly 18 about the shaft 12 is greater than that applied by the camera 36, e.g. the center of gravity or the center of mass of the body 14 and components coupled thereto lies between the axis of rotation of the body 14 and the weights 70. As such, the weights 70 resist diversion from their original path 76 more strongly than the camera 36 and swing, at least partially, about the shaft 12 toward the outside of the turn.

As depicted in FIG. 4C, as the vehicle 73 comes out of the turn, the airflow 74 acting on the wing 43 of the tail assembly 16 urges the rotating mount assembly 48 to rotate back into the direction of the air flow to again direct the camera 36 into the airflow 74 and in the direction of travel 75 of vehicle 73. The orientation of the camera 36 is thus controlled by the centrifugal forces and forces applied by the airflow 74 acting thereon and not by the orientation of the vehicle 73.

It is to be understood that in some applications, it may be preferable to adjust the center of mass of the rotating mount assembly 48 and camera so that it is located in front of the body 14 on the side of the camera 36 mounted thereto or balanced over the shaft axis. For example, drifting competitions involve drivers performing a series of controlled skids in which the direction of travel of the vehicle does not correspond to the direction the front of the vehicle is pointed. In such applications, it is more desirable to orient the camera 36 to obtain images from the direction the vehicle 73 is traveling and not the direction the vehicle is pointed.

When using the mount 10 to record images during drift racing, the user may prefer to adjust the weights 70 of the swing-weight assembly 18 to locate the center of mass of the rotating mount assembly 48 and the camera 36 in front of the shaft axis or to the front of the body 14 on the side that the camera 36 is located. As generally shown in FIG. 4D, the weight of the camera 36 therefore causes the rotating mount assembly 48 to generally orient the camera 36 in the direction that the vehicle 73 is actually traveling or sliding and not the direction it is pointing. The tail assembly 16 also assists in holding the rotating mount assembly 48 oriented into the direction of airflow which corresponds with the direction of travel of the vehicle 73 as opposed to the direction it is pointing.

The user may also prefer to balance the mass of the rotating mount assembly 48 and the camera 36 attached thereto over the shaft axis such that the effect of centrifugal forces acting on the rotating mount assembly 48 are minimized and the flow of air across the wing 43 is the primary force acting on the rotating camera mount 48. As such, the airflow acting on the rotating camera mount 48 urges the mount 48 and the camera 36 into the direction of travel and not into the direction of the turn.

Referring now to FIGS. 5-6, a camera mount 110 and operation thereof is described in accordance with an alternative embodiment of the invention. The camera mount 110 is similar to the camera mount 110 but does not include a tail assembly 116. The camera mount 110 can be employed when no airflow is provided or available from movements of the vehicle, such as when the camera mount 110 is mounted within the interior of the vehicle. The shaft 112 of the camera mount 110 is disposed at an angle or tilted with respect to vertical so as to allow gravity acting on the swing-weight assembly 118 to bias the camera 136 in a desired direction.

The bias is produced by gravity urging the swing-weight assembly 118 to seek a lowest point along a path followed by the swing-weight assembly 118 as it rotates around the shaft 112. The direction in which the shaft 112 is angled is selectable to adjust the direction in which the camera 136 is pointed, e.g. the shaft 112 might be angled to the left to bias the camera 136 toward the right as depicted in FIG. 5. The degree to which the shaft 112 is angled or tilted from vertical is also selectable to adjust the intensity of the bias, e.g. the greater the degree of tilt of the shaft 112 from vertical the more strongly the swing-weight assembly 118 will seek the lowest point and the stronger the bias applied thereby. The angle of the shaft 112 with respect to vertical is preferably between about 0 and about 45° or between about 0 and about 30° or more preferably between about 0 and about 20°.

As depicted in FIG. 6, the coupling assembly 120 of the camera mount 110 can comprise an adjustable gimbal mount 120A that enables the selective adjustment of one or more of the direction in which the shaft 112 is tilted and the degree of the tilt from vertical. The gimbal mount 120A can also provide remote adjustment of the shaft 112 via one or more cables coupled between the gimbal mount 120A and one or more control levers or via an electronically controlled system using, for example servo motors or the like to move the shaft 112. Using such a gimbal mount 120A enables the direction and degree of the shaft 112 to be remotely adjusted. For example, the camera mount 110 might be mounted on an exterior of a vehicle and be adjustable or steered from within the vehicle using the gimbal mount 120A.

In operation, the camera mount 110 functions similarly to the camera mount 10 but employs gravity acting on the swing-weight assembly 118 to provide directional bias instead of the airflow 74 acting on the tail assembly 16. In generally linear travel of a vehicle, like that depicted in FIG. 4A, gravity acts on the swing-weight assembly 118 to direct the camera 136 in the desired direction; the swing-weight assembly 118 seeks the lowest point along its path around the shaft 112. When a turn is encountered by the vehicle, greater centrifugal forces and/or torques about the shaft 112 are applied by the swing-weight assembly 118 than by the camera 136. The swing-weight assembly 118 thus swings, at least partially toward the outside of the turn and directs the camera 136 into the turn as depicted in FIG. 4B but without the use of the tail assembly 16. Upon completing the turn and returning to generally linear travel, the swing-weight assembly 118 again seeks the lowest point and directs the camera 136 in the desired direction.

With reference now to FIGS. 7A-C, a camera mount 210 is described in accordance with another embodiment of the invention. The camera mount 210 includes a coupling assembly 220 comprising a frame or base 280 having a generally equilateral triangular form with a lever actuated suction cup 271 or other coupling element disposed at each apex thereof for coupling to a vehicle. It is understood that the frame 280 can employ a variety of other shapes or forms without departing from the scope of embodiments of the invention described herein. The coupling assembly 220 also includes a tilt-adjustment assembly 281 disposed generally centrally on frame 280.

The tilt-adjustment assembly 281 includes first and second spaced-apart parallel bracket 282A and 282B. The first bracket 282A is integral with and centrally located on the frame 280 and the second bracket 282B is coupled thereto via a pair of fasteners 283 inserted therebetween. The brackets 282A-B also each include a central aperture 284 having a perimeter forming a portion of a sphere. A pivot-ball 286 is disposed at least partially within the apertures 284 and is captured between the parallel brackets 282A-B. The stud 226 extends from a portion of the pivot-ball 286 that is exposed within the central aperture 284 of the second bracket 282B for connection to the shaft 212 of the camera coupling assembly 220. The pivot-ball 286 is pivotable in any direction to enable positioning of the shaft 212 coupled thereto. One or both fasteners 283 between the first and second brackets 282A-B is loosened to enable positioning of the pivot-ball 286 and tightened to restrict movement of the pivot-ball 286.

The camera mount 210 includes a combined tail assembly 216 and swing-weight assembly 218. The camera mount 210, as depicted in FIGS. 7A-C, does not include the tail-brake mechanism 50, drag mechanism 56, or stop pin 65 associated with tail assembly 216 or the swing-weight assembly 218 but may be configured to include one or more of these components to aid dampening or restricting rotational movements of the body 214 with respect to the shaft 212.

The arm 242 of the tail assembly 216 is inserted in a first bore 290 in the tail-mount portion 240 of the body 214 and is fixedly and removeably coupled therein using a set screw or other fastener 291 disposed in a transverse aperture that intersects the first bore 290. The fastener 291 can retain the arm 242 in the first bore 290 by impinging on a sidewall thereof or by receipt in a hole, slot, or other feature in the sidewall of the arm 242 among other ways known in the art. The arm or elongate member 242 shown is formed from a single tube or rod and bent to include a first or horizontal segment 296 projecting from the tail-mount portion 240 and a second or upwardly angled segment 297 at the distal end thereof. Wing 243 is mounted on the upwardly angled segment 297 of the arm 242 near the distal end thereof. The wing 243 is preferably positioned by arm 242 in spaced relation above a camera 236 mounted on the camera-mounting member 234 so that the camera 236 does not block the flow of air across the stabilizing wing 243.

The weight 270 of the swing-arm assembly 218 is disposed on the arm 242 of the tail assembly 216. Only one weight 270 is depicted, however any number of weights 270 can be employed. The weight 270 includes one or more O-rings 299 disposed between an interior surface thereof and the sidewall of the arm 242 to frictionally engage the sidewall and at least partially resist sliding movement of the weight 270 along the arm 242. The interior surface of the weight 270 may include one or more annular channels within which the O-rings 299 can be seated. The O-rings 299 enable the weight 270 to be slidingly moved along the arm 242 to adjust the position of the weight 270 therealong and to maintain the adjusted the position of the weight 270 during operation of the camera mount 210.

Alternatively, one or more frictional pads or other frictional members can be disposed between the weight 270 and the arm 242 or the arm 242 or weight 270 can be coated or formed from a material having frictional properties to at least partially resist sliding movement between the weight 270 and the arm 242. A set screw or other fastener might also be disposed in the weight 270 to impinge or engage the sidewall of the arm 242 to resist movement of the weight 270.

Operation of the camera mount thus enables adjustment of the rotational movements of the camera mount 210 to be carried out in a similar manner to that described above by sliding the weight 270 along the arm 242. The shaft 212 of the camera mount 210 can be disposed at an angle or tilted with respect to vertical to provide a directional bias for the camera mount 210 as described previously. The bias can be employed with or without the use of the tail assembly 216.

Figure 8:
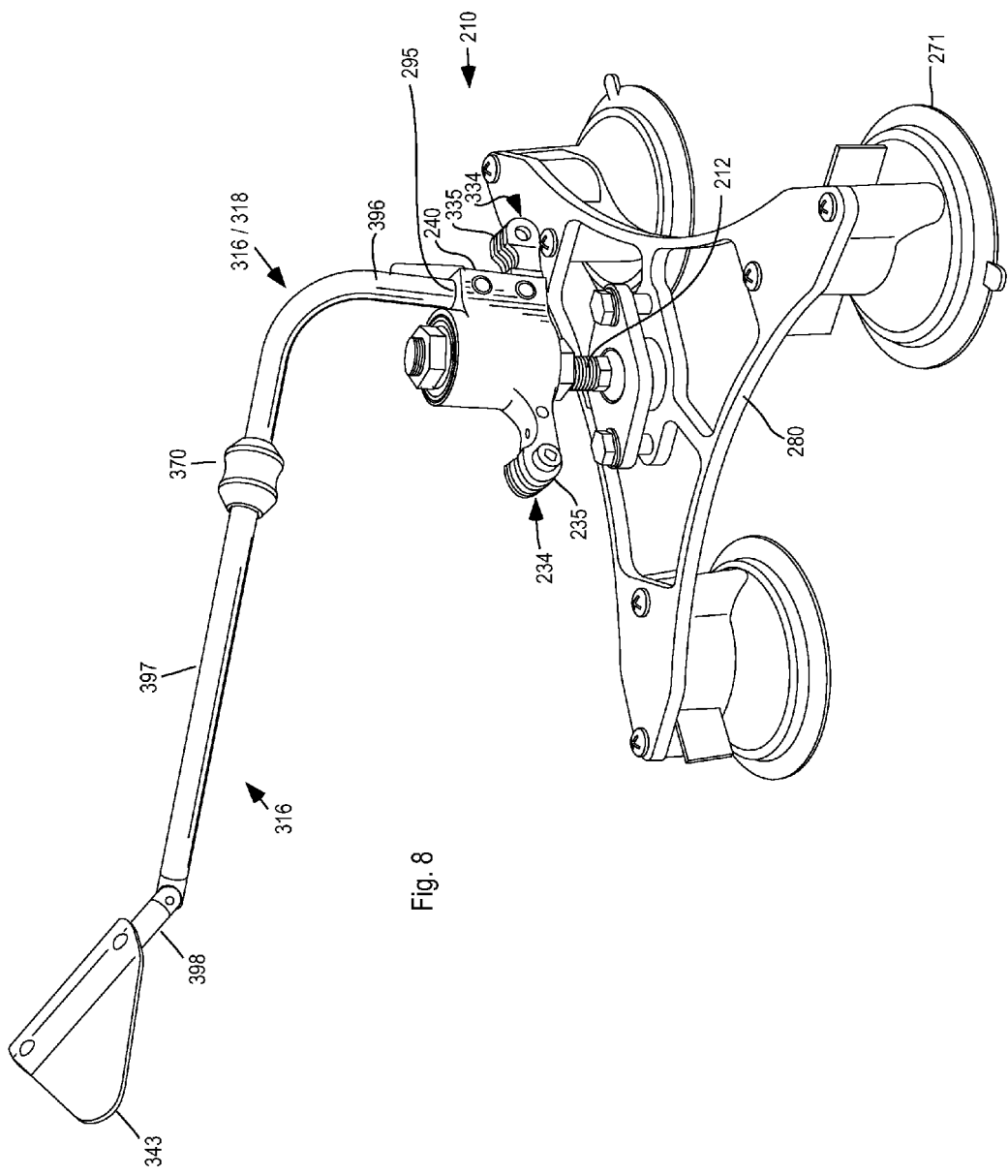
FIG. 8 is a perspective view of a reconfigured version of the camera mount shown in FIGS. 7A-C having a secondary camera mounting member and an alternative tail assembly attached thereto to facilitate mounting of two cameras thereon.
Figure 9:
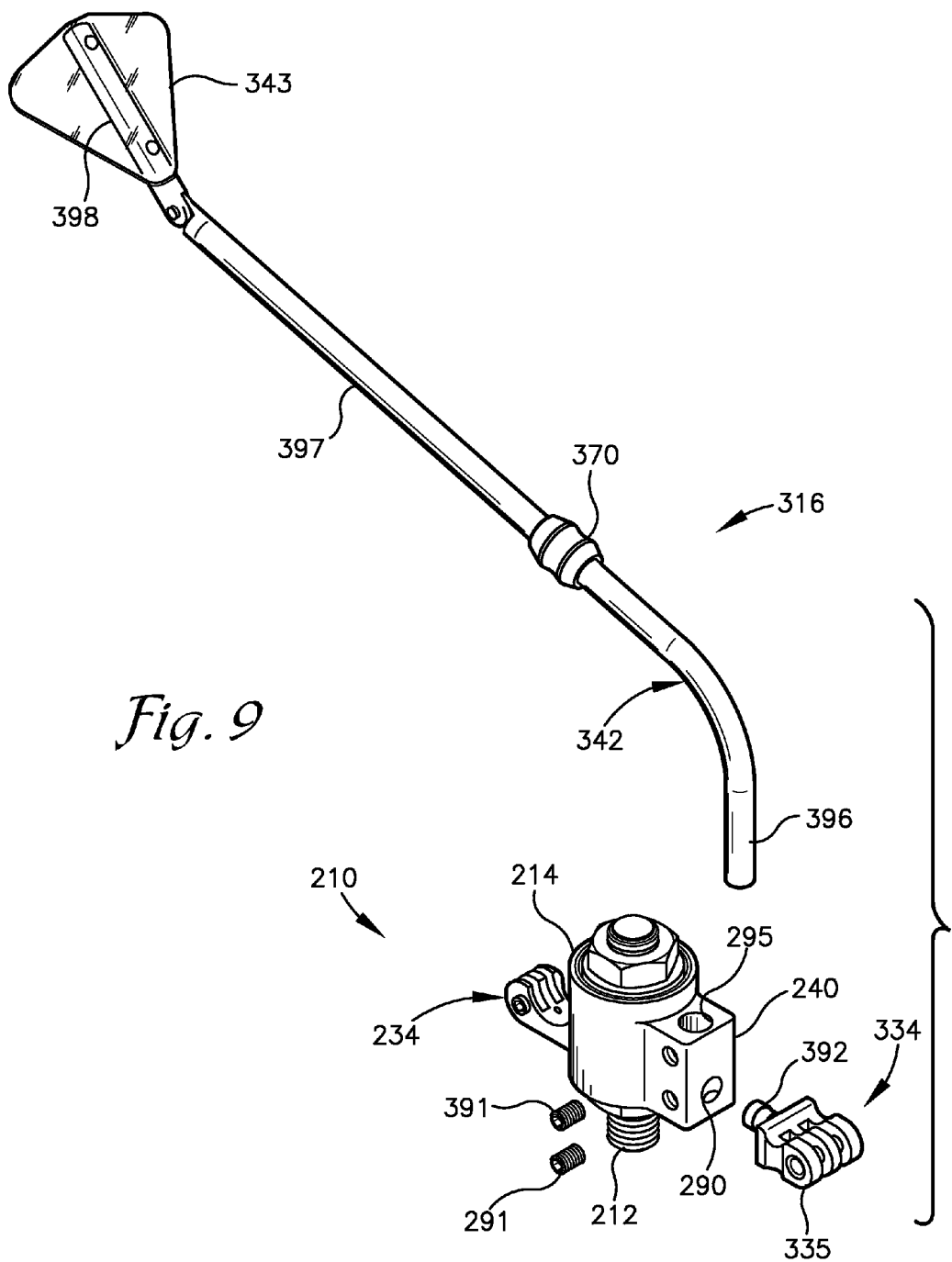
FIG. 9 is an exploded, perspective view of the reconfigured camera mount as shown in FIG. 8.
Figure 10:
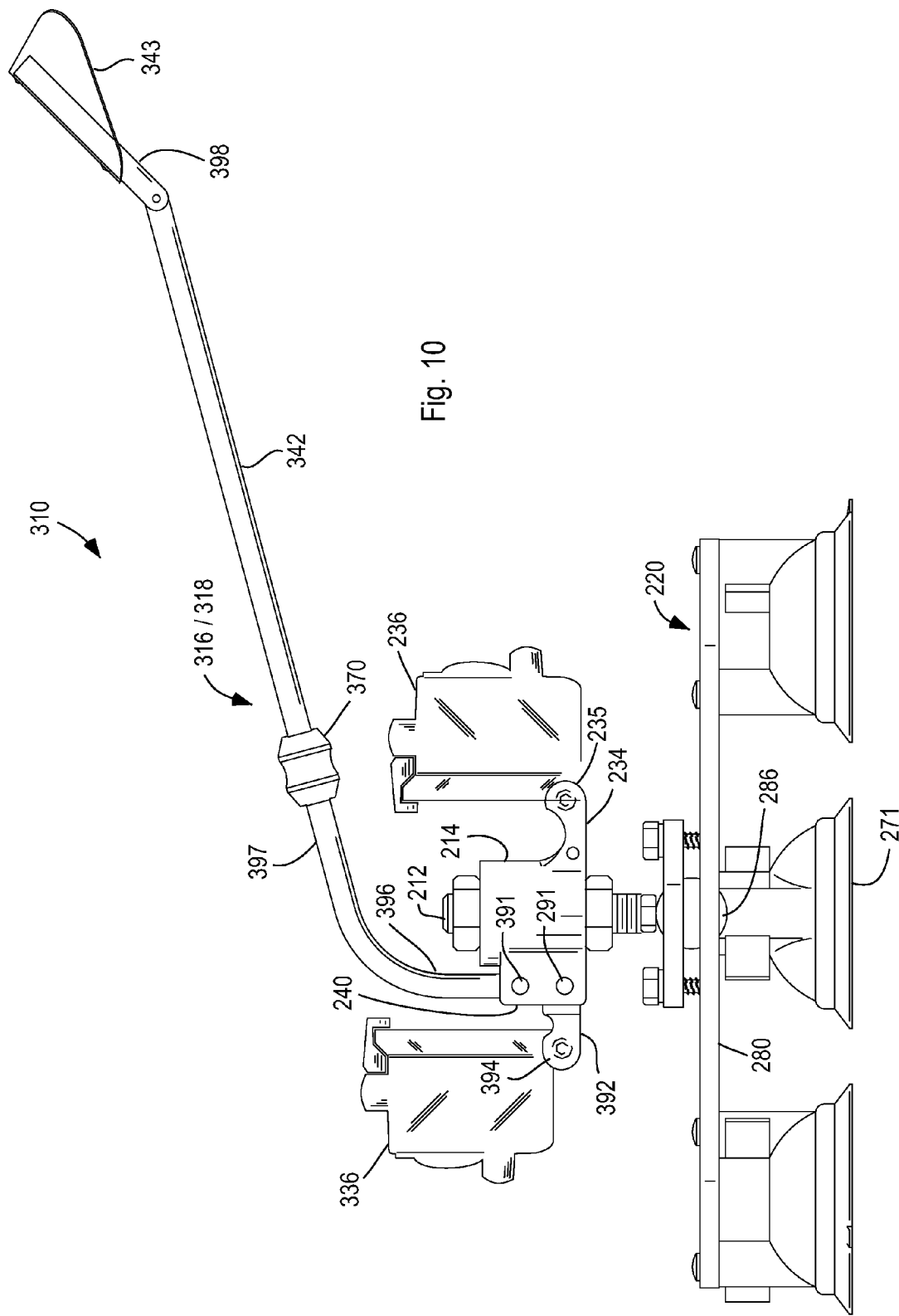
FIG. 10 is a side elevational view of the reconfigured camera mount as in FIGS. 8 and 9 with the alternative tail assembly oriented in an opposite direction and two cameras shown mounted thereon.

Referring now to FIGS. 8-10, an alternative tail assembly 316 and a secondary camera-mounting member 334 are provided to allow reconfiguration of the camera mount 210. The alternative tail assembly 316 may be utilized and oriented such that the camera 236 generally faces rearward in the direction of the tail assembly 316 as shown in FIG. 10. The alternative tail assembly 316 may be used in combination with the secondary camera-mounting member 334 to allow the mounting of two cameras 236 and 336 on the camera mount 210 and directed in opposite directions, e.g. the first camera 236 directed in the same direction as the alternative tail assembly 316, and a second camera 336 directed in the direction opposite the tail assembly 316.

A second bore 295 is formed in the tail-mount portion 240 for receipt of the arm 342 of alternative tail assembly 316. The second bore 295 is oriented generally vertical and transverse to the first bore 290 to receive the arm 342 into the top of the tail-mount 240. The arm 342 is fixedly and removeably retained in the second bore 295 using a set screw or other fastener 391 disposed in a transverse aperture that intersects the second bore 290.

The arm 342 of the alternative tail assembly 316 includes a generally vertical first portion or segment 396 and a second portion or segment 397 that extends from a distal end of the first portion 396 and at an angle thereto. The arm 342 also includes a third segment 398 which may be pivotally connected to the second segment 397 and to which the stabilizing wing 343 is attached. The angular orientation of the third segment 398 relative to the second segment 397 may be adjustable and then fixed using a screw connecting the second and third segments together.

To configure the mount 210 to orient the camera opposite the direction of travel of a vehicle 273 to which it is attached, the arm 342 of the alternative tail assembly 316 is secured in the second bore 295 with the second segment 397 of the arm 342 extending back over the body 214 and radially outward from the body 214. The arm 342 extends over the first camera mount 234 with the stabilizing wing 343 positioned in spaced relation past the first camera mount 234 but facing or oriented with a leading edge directed back to the body 214 and shaft axis. The first segment 396 of arm 342 is of sufficient length to place the second segment 397 above the first camera 236 mounted on the first camera mounting member 234. The weight 370 is slidably or adjustably mounted on the second segment 397 of alternative arm 342 to adjust the center of mass of the rotating coupling assembly. As shown in FIG. 10, the alternative tail assembly 316 is secured to the mount body 214 to generally orient a camera 236 mounted on the first camera mounting member 234 rearward relative to the direction of travel of the vehicle and away from the direction of the wind.

A second camera 336 may be mounted to the camera mount 210 by first attaching the secondary camera mounting member 334 thereto. The secondary camera mounting member 334 includes a connector or stem 392 that is insertable in the first bore 290 in the tail mount 240 and fixedly and removeably retained therein using the setscrew or other fastener 291 disposed in the transverse aperture that intersects the first bore 290. The fastener 291 can retain the connector 392 for secondary camera mounting member 334 in the first bore 290 by impinging on a sidewall thereof and/or by receipt in a recess 393, hole, slot, or other feature in the sidewall thereof or in other ways known in the art. Alternatively, the secondary camera mounting member 334 may be formed integral with the body 214 of the camera mount 210.

The secondary camera mounting member 334 also includes one or more mounting flanges 335 (three are included in the embodiment shown) formed at a distal end thereof and configured to couple to mating flanges associated with a housing for a camera 336 to be mounted thereon. The coupling between the mounting flanges 335 on the secondary camera mounting member 334 and the housing for camera 336 may allow the camera 336 to be pivotably adjusted about a generally horizontal axis, e.g. an axis that is perpendicular to the shaft 212, or about another axis.

Operation of the reconfigured camera mount 210 thus enables capture of images from both a forward and a rearward oriented perspective. Adjustment of the rotational movements of the reconfigured camera mount 210 is carried out in a similar manner as that described above, but the weight and/or the centrifugal forces on the second camera 336 must be accounted for. The shaft 212 of the reconfigured camera mount 210 can be disposed at an angle or tilted with respect to vertical to provide a directional bias for the camera mount 210 as described previously. The bias can be employed with or without the use of the alternative tail assembly 316.

It is foreseen that the orientation of the tail assembly 316 could be reversed. The reversed tail assembly 316 would enable operation of the camera mount 210 in an opposite orientation, e.g. the second camera 336 facing rearward and the first camera 236 facing forward into the direction of vehicular motion.

With reference to FIGS. 11-13, a camera mount 410 is depicted in accordance with another embodiment of the invention. The camera 436 of the camera mount 410 is mounted on a slide plate assembly 415 which allows the position of the camera 436 relative to the axis of rotation about the shaft 412 to be adjusted. Shaft 412 is threadingly coupled to a hub assembly 417 comprising upper and lower discs 419 and 421 between which a bearing assembly 428 is secured. In the embodiment shown, a recess 423 is formed in an outer periphery of the upper disc 419 below a peripheral flange 425. The lower disc 421 is wider in diameter than the recessed portion of upper disc 419 and an inner portion or inner race of the bearing assembly is clamped between the peripheral flange 425 of upper disc 419 and the outer periphery of lower disc 421.

An outer race of the bearing assembly is connected to the underside of a base plate or body 437 of the slide plate assembly 415. The base plate 437 functions as a rail, track or guide and in the embodiment shown, upper sidewalls 438 of the base plate 437 angle outward to form a dovetail in cross-section. The axis of rotation of the camera mount 410 through shaft 412 is perpendicular to a longitudinal axis of the rail or track formed by the base plate 437.

Slide plate assembly 415 further comprises a camera mounting member or camera carrier 439 slidably mounted on the base plate 437. Camera carrier 439 includes a slot or groove 440 formed in and extending longitudinally along the underside of the camera carrier 439. Groove 440 has a mating geometry as the dovetail formed on the base plate 437 with inwardly sloping sidewalls 441 formed in the camera carrier 439 defining the sides of the groove 440. The groove 440 is sized slightly wider than the dovetailed sidewalls 438 of base plate 437 to allow the camera carrier 439 to slide longitudinally along or over the base plate 437. A set screw 442 extending through a sidewall 441 of the camera carrier 439 is selectively driven into the engagement with a sidewall 438 of the base plate 437 to fix the longitudinal position of the camera carrier 439 relative to base plate 437.

A camera 436 or housing 445 for a camera 436 is mounted on the camera carrier 439, by bolting the camera 436 or camera housing 445 thereto, such that the lens 447 of the camera 436 is oriented in alignment with the longitudinal axis of the slide plate assembly 415. The camera 436 will typically be mounted on the camera carrier 439 such that the lens is directed toward or past a front end 450 of the camera carrier 439.

A tail assembly 416 is connected to and projects longitudinally from a rear end 451 of the base plate 437. The tail assembly 416 may be constructed in a manner similar to the other tail assemblies shown herein and in the embodiment shown, tail assembly 416 is shown constructed similar to tail assembly 416 with an arm 452 formed from a plurality of segments and a wing 453 mounted near the end of the arm 452. The arm segments are pivotal relative to one another to adjust the orientation of the wing 453.

By sliding the camera carrier 439 with a camera 436 mounted thereon relative to the base plate 437 the center of mass of the camera mount 410 and attached camera 436 may be adjusted to locate the center of mass toward the front end of the slide plate assembly 415 and on a side of the shaft 412 opposite the tail assembly 416, to locate the center of mass directly over the shaft 412 or to locate the center of mass on the same side of the shaft 412 as the tail assembly 416.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A rotatable camera mount for mounting a camera on a vehicle, the camera mount comprising:
   a shaft having a shaft axis; and
   a rotating mount assembly comprising:
      a body rotatably coupled to the shaft and rotatable about the shaft axis; a primary camera-mounting member located on a first side of the body and to which a first camera may be removably secured and oriented for recording images from a first direction;
      and a swing-weight coupled to and projecting from a second side of the body, opposite the first side, the swing-weight providing a center of mass associated with the rotating mount assembly having a first camera secured thereto that is located in spaced relation from the shaft axis toward the second side of the body; and
      a stabilizing wing supported in spaced relation from the body and configured to urge the rotating mount assembly to rotate such that the stabilizing wing is aligned with an airflow thereacross.

2. The camera mount of claim 1, further comprising a base removably secureable to a surface of a vehicle and a shaft connector for connecting the shaft to the base.

3. The camera mount as in claim 1 wherein said swing-weight is moveably mounted on an arm extending radially outward from the second side of the body, opposite the primary camera-mounting member, said weight selectively positionable along the arm to adjust the spacing of the center of mass relative to the shaft axis.

4. The camera mount of claim 1, wherein the stabilizing wing comprises a portion of a tail assembly further comprising:
   a pivot member coupled to the body and configured to pivot about a pivot axis that is substantially perpendicular to the shaft axis, the pivot member including a brake pin extending toward a friction disc that is affixed to the shaft, the pivot member being biased to pivot in a first direction about the pivot axis to draw the brake pin away from the friction disc; and
   an elongate member coupled to the pivot member and extending radially outward from the body, the wing of the tail assembly being coupled near a distal end of the elongate member, the elongate member pivoting the pivot member in an opposite second direction about the pivot axis to place the brake pin into frictional engagement with the friction disc when an airflow encountered by the wing provides sufficient force to overcome the bias toward rotation in the first direction on the pivot member.

5. The camera mount of claim 1, wherein the stabilizing wing is mounted on an arm connected to said body and the swing-weight is disposed upon and axially moveable along the arm.

6. The camera mount of claim 5, wherein a receiver is formed in the body opposite the camera-mounting member for selectively receiving an inner end of the arm for connecting the arm and the stabilizing wing to the body or a camera-mounting member connector for a secondary camera-mounting member such that when the camera-mounting member connector for the secondary camera-mounting member is secured in the receiver, a second camera may be mounted on the secondary camera-mounting member such that the camera viewing direction of the second camera faces the second direction.

7. The camera mount of claim 2 wherein the shaft connector includes a tilt-adjustment assembly that enables selective angular orientation of the shaft and the shaft axis relative to the base.

8. The camera mount of claim 7, wherein the base includes one or more of suction cups, magnets, clamps or fasteners for removably securing the base to the surface of a vehicle.

9. The camera mount of claim 1,
   wherein a bearing assembly is disposed around the shaft and near each of an upper and lower end of the body, a sleeve is disposed around the shaft and extends between the bearing assemblies, and a space between the sleeve and the body is filled with a viscous fluid to provide fluid dampening of rotational movements of the body about the shaft.

10. The camera mount of claim 9, wherein the viscous fluid is a silicon material.

11. The camera mount of claim 1, wherein the shaft is angled with respect to vertical and the swing-weight directionally biases a rotational orientation of the body with respect to the shaft.

12. The camera mount of claim 1, further comprising:
a friction disc affixed to the shaft; and
a drag assembly coupled to the body and adjustably frictionally engaging a surface of the friction disc, the drag assembly being adjustable to provide a desired amount of resistance to rotation of the body with respect to the shaft.

13. The camera mount of claim 2, further comprising:
a stop pin extending from the body; and
one or more obstructing members associated with the shaft that obstruct a path followed by the stop pin as the body rotates with respect to the shaft, the one or more obstructing members being selectively positionable about the shaft to define a desired range of rotational movement of the base with respect to the shaft.

14. A rotatable camera mount for coupling a camera to a vehicle, the camera mount comprising:
a coupling assembly removably couplable to a vehicle;
a shaft coupled to the coupling assembly and having a shaft axis extending therethrough; and
a rotating mount assembly comprising:
a body rotatably coupled to the shaft and rotatable about the shaft axis;
a primary camera-mounting member extending from a first side of the body and to which a first camera may be removably secured and oriented for recording images from a first direction;
a tail assembly including an arm that is coupled to a second side of the body, opposite the first side, a stabilizing wing mounted on the arm in spaced relation from the body and configured to urge the rotating mount assembly to rotate to an orientation in which the stabilizing wing is aligned with an airflow thereacross, and
a swing-weight mounted on and selectively positionable along the arm to adjust the center of mass of the rotating mount assembly toward and away from the shaft.

15. The camera mount of claim 14, further comprising:
a second camera-mounting member extending from the second side of the body, the second camera-mounting member configured to support a second camera that is oriented for recording images from a second direction, and
wherein the arm includes a first leg extending substantially parallel to the shaft axis and a second leg extending at an angle relative to the first leg, the first leg having a length sufficient to provide clearance between the second camera and the second leg of the arm.

16. The camera mount of claim 14, wherein the arm of the tail assembly extends from the second side of the body toward and radially outward from the first side of the body.

17. A rotatable camera mount for coupling a camera to a vehicle, the camera mount comprising:
a coupling assembly removably couplable to a vehicle;
a shaft coupled to the coupling assembly and having a shaft axis extending therethrough; and
a rotating mount assembly comprising:
a body rotatably coupled to the shaft and rotatable about the shaft axis;
a primary camera-mounting member located on a first side of the body and to which a first camera may be removably secured and oriented for recording images from a first direction;
a tail assembly including a stabilizing wing mounted in spaced relation from the second side of the body and configured to urge the rotating mount assembly to rotate to an orientation in which the first camera is oriented into the direction of airflow across the stabilizing wing, and
a swing-weight assembly comprising a swing weight support member projecting radially outward from the second side of the body and a swing-weight mounted on and selectively positionable along the swing weight support member to adjust the center of mass of the rotating mount assembly toward and away from the shaft.

18. The rotatable camera mount as in claim 17 wherein the stabilizing wing is mounted on a support arm connected to the second side of the body in spaced relation from the swing weight support member.

19. The rotatable camera mount as in claim 18 wherein the support arm is selectively orientable to extend from the second side of the body, over the shaft and radially outward relative to the first side of the body and over the first camera secured on the primary camera-mounting member.

20. The rotatable camera mount as in claim 17, wherein the stabilizing wing is mounted on the swing weight support member.

21. A rotatable camera mount for mounting a camera on a vehicle, the camera mount comprising:
a coupling assembly couplable to a vehicle; and
a rotating mount assembly comprising:
a hub rotatably-connected to the coupling assembly and rotatable about an axis of rotation;
a camera mounting member projecting outward from coupled to said hub and to which a camera may be secured;
a tail projecting outward relative to said hub in radial alignment with said camera mounting member and configured to urge said rotating mount assembly to rotate to an orientation in which said tail is oriented in the direction of airflow thereacross; and
adjustment means for adjusting the center of mass of the rotating mount assembly with a camera secured to said camera mounting member in a direction generally transverse to said axis of rotation of said hub.

22. The rotatable camera mount as in claim 21 wherein said tail projects upward relative to said hub.

23. The rotatable camera mount as in claim 21 wherein a portion of said tail extends above a camera mounted on the camera mounting member.

24. The rotatable camera mount as in claim 21 wherein said adjustment means comprises a swing-weight coupled to and projecting from the hub in radial alignment with said tail, the position of the swing-weight relative to the hub adjustable to adjust a center of mass associated with the rotating mount assembly.

25. The rotatable camera mount as in claim 24 wherein said swing weight is slidably mounted on said tail.

26. A rotatable camera mount for mounting a camera on a vehicle comprising:
a coupling assembly couplable to a vehicle; and
a rotating mount assembly comprising:
a hub rotatably connected to the coupling assembly and rotatable about an axis of rotation;
a camera mounting member connected to said hub and to which a camera may be removably secured and oriented for recording images;

a swing weight assembly comprising a swing weight support member projecting outward from said hub and a swing-weight mounted on and selectively positionable along the swing weight support member to adjust the center of mass of the rotating mount assembly generally transverse to the axis of rotation of said hub; and orienting means for urging said rotating mount assembly to rotate laterally to a selected rotational orientation to orient a camera mounted on said camera mounting member in a desired direction in which said orienting means is oriented in the direction of airflow thereacross.

27. The rotatable camera mount as in claim 26 wherein said camera mounting member projects from a first side of said hub and said swing weight support member projects radially outward from a second side of said hub, opposite said first side thereof.

28. The rotatable camera mount as in claim 26 wherein said orienting means comprises a tail projecting outward relative to said hub in radial alignment with said camera mounting member and configured to urge said rotating mount assembly to rotate to an orientation in which said tail is oriented in the direction of airflow thereacross.

29. The rotatable camera mount as in claim 26 wherein said orienting means comprises the swing weight assembly in combination with the shaft extending at an angle offset from vertical such that the swing-weight directionally biases the rotating mount assembly to a rotational orientation in which the swing weight extends in the direction from which the shaft is offset from vertical.

* * * * *